United States Patent [19]
Meier-Kaiser et al.

[11] Patent Number: 5,639,404
[45] Date of Patent: Jun. 17, 1997

[54] METHOD AND APPARATUS FOR PREPARING THERMOPLASTIC SHEETS, FILMS, AND PLATES

[75] Inventors: Michael Meier-Kaiser, Pfungstadt; Horst Greb, Reinheim, both of Germany

[73] Assignee: Roehm GmbH Chemische Fabrik, Darmstadt, Germany

[21] Appl. No.: 534,581

[22] Filed: Sep. 27, 1995

[30] Foreign Application Priority Data

Sep. 27, 1994 [DE] Germany .................. 9415619 U

[51] Int. Cl.⁶ .................. B29C 47/92; B29C 43/58
[52] U.S. Cl. .................. 264/40.1; 264/412; 264/40.7; 264/175; 264/210.2; 425/140; 425/327
[58] Field of Search .................. 264/40.1, 411, 264/40.7, 412, 210.2, 280, 175; 425/140, 141, 327

[56] References Cited

U.S. PATENT DOCUMENTS

| | | | |
|---|---|---|---|
| 4,028,031 | 6/1977 | Seide | 425/327 |
| 4,428,896 | 1/1984 | Stevenson | 425/140 |
| 4,722,820 | 2/1988 | Flecknoe-Brown | 264/210.2 |
| 4,844,766 | 7/1989 | Held | 264/40.7 |
| 4,858,139 | 8/1989 | Wirtz | 264/40.7 |
| 5,030,079 | 7/1991 | Benzing, II | 264/175 |
| 5,094,790 | 3/1992 | Halter | 264/40.7 |
| 5,158,724 | 10/1992 | Yagi et al. | 264/40.7 |
| 5,262,101 | 11/1993 | Yagi et al. | 264/40.7 |
| 5,529,730 | 6/1996 | Gross | 264/40.1 |

FOREIGN PATENT DOCUMENTS

| | | | |
|---|---|---|---|
| 0211989 | 3/1987 | European Pat. Off. | 264/40.7 |
| 0273985 | 7/1988 | European Pat. Off. | |
| 0429161 | 5/1991 | European Pat. Off. | |
| 53-10624 | 4/1978 | Japan | 264/40.7 |
| 63-201514 | 8/1988 | Japan | 425/140 |
| 2-32823 | 2/1990 | Japan | 264/40.1 |
| 2-194917 | 8/1990 | Japan | 425/141 |
| WO94/06616 | 3/1994 | WIPO | |

OTHER PUBLICATIONS

Patent Abstracts of Japan, vol. 8, No. 112 (M–298), May 25, 1984, JP 59–020626, Feb. 2, 1984.

*Primary Examiner*—Jeffery R. Thurlow
*Attorney, Agent, or Firm*—Oblon, Spivak, McClelland, Maier & Neustadt, P.C.

[57] ABSTRACT

The height of the bulge in the glazing roll gap of a supercalender in the extrusion of plates or films of a thermoplastic material smoothed on both sides may be controlled by measuring the location of the edges of the plastic sheet by means of measuring sensors and regulating the speed of the roll or the rate of extrusion of the polymer melt based on the width of the sheet so that the height of the bulge is always kept within tight tolerances.

11 Claims, 1 Drawing Sheet

METHOD AND APPARATUS FOR PREPARING THERMOPLASTIC SHEETS, FILMS, AND PLATES

BACKGROUND OF THE INVENTION

1. Field of the Invention

The present invention relates to extrusion engineering for thermoplastically deformable plastics, in particular to the control of the height of bulge in the glazing roll gap for supercalender devices for extrusion of plastic sheets for plates or films that are smoothed on both sides. In particular, the present invention relates to apparatus and methods for the extrusion of thermoplastic sheets, plates, and films.

2. Discussion of the Background

Extrusion systems for thermoplastic materials are known. Usually supercalenders (roll-mills) are employed for smoothing the two surfaces of plastic sheets for plates or films. The purpose of the rolls in this case is for shaping and cooling the molten plastic. The rolls take the plastic exiting vertically from a fishtail die in the molten state into the glazing roll gap between two driven inlet rolls. Usually the plastic sheet is taken off by one of the inlet rolls and diverted into the horizontal direction by means of a second roll, which in turn presses against the inlet roll. The plastic sheet attains a defined thickness and a smooth surface due to its being pressed through the glazing roll gap between the inlet rolls.

Factors that affect the surface condition of plastic sheets for plates and films smoothed on both sides are the composition of the polymer, the temperature and the viscosity of the molten polymer stream, the temperature and the surface condition of the rolls, the size of the glazing roll gap and the roll speed.

A uniform passage of the plastic through the glazing roll gap in this case is exceptionally important for obtaining a satisfactory surface of the extruded material. In this case, to prevent surface malformations, the height of the so-called bulge (or flashback) is very important. The bulge forms in the glazing roll gap between the inlet rolls due to the backwash of the polymer melt. Fluctuations due to local differences in mass flow in the polymer melt exiting the extrusion nozzle lead to differing melt accelerations at the surface of the inlet roll, so that the height of the bulge also changes.

The height of the bulge should only fluctuate within the smallest possible tolerances. If it is too low, the contact of the extrudate with the roll 1 can be lost. This results in a poor extrudate surface or can lead to sticking to the roll 2 due to the highly changed cooling conditions. The so-called wrapping then leads to the collapse of the process and to a system shutdown lasting several hours.

An excessive bulge leads to malformations of the extrudate surface due to the so-called bulge roll. In this case, due to contact with the inlet extrudate stream, the bulge is contracted coil-like from above and rolled up to a certain extent. This leads to formation of streaks running transverse to the surface of the extrudate. In an extreme case, the stagnation bulge can also reach the lip of the nozzle and foul it, which in turn leads to malformation of the extrudate surface. The nozzle can only be cleaned when the system is shut down.

Several methods for controlling the height of the bulge are known. In practice, it is commonplace to implement a manual adjustment of the height of the bulge by measuring the thickness of the cooled plastic sheet and performing the adjustment by a change in the speed of the roll. The disadvantage of this method is that the intervention takes place manually and is thus exposed to subjective influences. Due to the relatively delayed measurement of thickness, there is moreover a comparatively high reject rate until the adjustments are within the desired tolerance.

In addition, direct measurements of the height of the bulge by means of mechanical sensors or by the laser triangulation method are known. The mechanical method is very imprecise, whereas the optical method has the disadvantage that it is fraught with error due to the high temperatures occurring in the vicinity of the stagnation bulge and due to the resultant fluctuation in air density.

An automatic control operating by means of an adjusting dial is described in DE 40 33 661 C2. The contact pressure is measured continuously on one of the inlet rolls as a measure for the thickness of the material sheet and is controlled by means of the roll speed. However, since the contact pressure depends not only on the thickness of the material sheet, but also on the viscosity and the temperature of the plastic stream, this control is also unsatisfactory.

From G 92 12 406.2, the control of the height of bulge for the extrusion of transparent films with a thickness of less than 5 mm is known. The measurement of the orientation birefringence of the extruded film was used as a measure for the height of the bulge and was controlled by the change of the setting of the mass flow of the extrusion nozzle.

Greek Patent No. 85.1420 describes a device to control the height of the bulge in the production of a plastic sheet smoothed on both sides. The size of the bulge is held constant by using as information the surface temperature of the sheet after its outlet from the roll gap. In case of deviations from the desired temperature associated with the state of continuous operation, the rate of extrusion of mold material is increased or decreased. The disadvantage of this method is that it is too inaccurate.

Devices that seek to control the height of the bulge by means of measuring the width of the extruded material are not known. Thus, there remains a need for a method and apparatus for controlling the height of the bulge of thermoplastic in the glazing roll gap of a supercalender in the extrusion of thermoplastic plates, films, or sheets.

SUMMARY OF THE INVENTION

Accordingly, it is one object of the present invention to provide a novel apparatus for supercalendering devices for plates or films that will allow the control of the height of the bulge by means of a simple but very sensitive adjustment quantity.

It is another object of the present invention to provide a novel method for controlling the height of the bulge of thermoplastic in the glazing roll gap of a supercalender in the extrusion of thermoplastic plates, films, or sheets.

These and other objects, which will become apparent during the following detailed description, have been achieved by the inventors' discovery that it is possible to control the height of the bulge in the glazing roll gap of a supercalender in the extrusion of plates or films of thermoplastic material smoothed on both sides by measuring the position of the edges of the extruded plastic sheet downstream from the glazing roll gap and in the event of a deviation from a specified value adjusting a variable that affects the height of the bulge so that the desired values are again attained.

Thus, the present invention provides an apparatus for forming a thermoplastic sheet which comprises: (i) an extruder; (ii) a supercalender device with a glazing roll gap positioned to receive thermoplastic melt from said extruder; (iii) means for detecting a change in the width of thermoplastic sheet exiting from said glazing roll gap; and (iv) means for adjusting a process parameter which will affect the height of a thermoplastic bulge in the glazing roll gap in response to a change in said width of said thermoplastic sheet exiting said glazing roll gap.

The present invention also provides a method for controlling the height of a thermoplastic bulge in a glazing roll gap of a supercalender device for forming a thermoplastic sheet, comprising (i) measuring a change in the width of a thermoplastic sheet exiting the glazing roll gap; and (ii) adjusting a process parameter that affects the height of the bulge in response to a change in the width of the thermoplastic sheet.

In this case, the present invention is based on the relationship between the width of the plastic sheet and the height of the bulge. Deviations from the permissible height of the bulge lead to changes in the width of the plastic sheet which are registered by measuring sensors and, by means of a control circuit, they result in a change of the process parameters, such as roll speed or polymer extrusion rate.

The advantage of the present invention rests in the fact that the width of the plastic sheet is a particularly sensitive indicator for the change in the height of bulge. Of course, plates and films are much wider than they are thick. Changes in the height of the bulge therefore lead to larger differences in measured value of the width than in the thickness of the material. The result is a high sensitivity. In addition, the device is suitable both for films and also for plates of commercial thickness from about 100 μm up to 50 mm, independent from their transparency.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
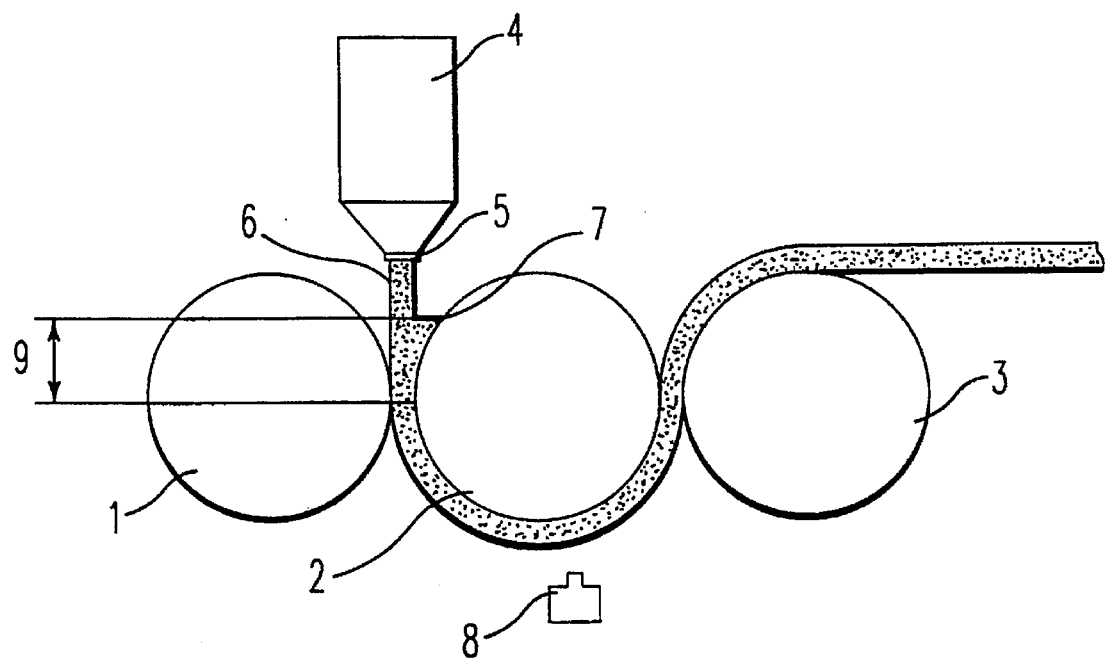
FIG. 1 is a schematic representation of a supercalender with three rolls transverse to the extrusion direction, where the position of the measuring sensors is indicated underneath roll 2. Only the measuring sensor located up front in the viewing direction is visible.
Figure 2:
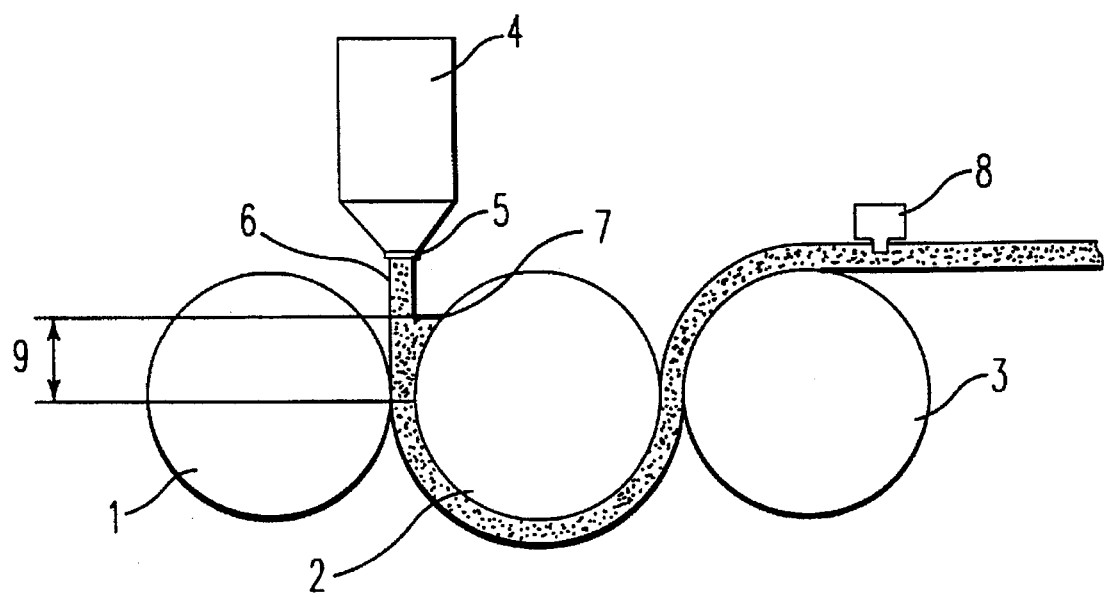
FIG. 2 is a schematic representation of a supercalender with three rolls transverse to the extrusion direction, where the position of the measuring sensors is indicated downstream from roll 3. Only the measuring sensor located up front in the viewing direction is visible.

The reference numbers used in FIGS. 1 and 2 are as follows:
1: Roll 1 of the supercalender;
2: Roll 2 of the supercalender;
3: Roll 3 of the supercalender;
4: Extrusion nozzle from the side;
5: Lip of the extrusion nozzle from the side;
6: Polymer melt;
7: Bulge;
8: Measuring sensor; and
9: Height of bulge.

DETAILED DESCRIPTION OF THE PREFERRED EMBODIMENTS

Thus, in a first embodiment, the present invention provides an apparatus for forming a thermoplastic sheet. In the context of the present invention the term sheet includes plates and films. The thermoplastic can be any which is conventionally formed into sheets, such as polyethylene, polypropylene, polyamides, polyesters, polystyrenes, polycarbonates, polymethylmethacrylate, etc.

The present apparatus comprises: (i) an extruder; (ii) a supercalender with a glazing roll gap positioned to receive thermoplastic melt from the extruder; (iii) means for measuring a change in the width of the thermoplastic sheet exiting from the glazing roll gap; and (iv) means for adjusting a process parameter which affects the height of the thermoplastic bulge in the glazing roll gap in response to a change in the width of the thermoplastic sheet. The extruder may be any that is conventionally used for the extrusion of thermoplastics. Similarly, the supercalendering device with a glazing roll gap is conventional, when the means for measuring the width of the thermoplastic sheet and means for adjusting the process parameter are excluded.

Typically, the means for measuring the width of the thermoplastic sheet exiting the glazing roll gap will be a measuring sensor. Measuring sensors are located in pairs at the right and at the left edge downstream from the glazing roll gap on a supercalender to register the position of the edges of the plastic sheet. The positioning can take place, in principle, at almost any position behind (downstream from) the glazing roll gap. In the interest of the shortest possible response times, a registry of the measured value of the plastic sheet takes place preferably at not too great a distance downstream from the glazing roll gap. One particularly suitable position when using a glazing roll with three rolls is at roll 2 (FIG. 1). Regardless of the number of rolls present, a position behind the glazing roll is suitable. This position can be located, e.g., directly behind roll 3, e.g., in a three-roll glazing roll (FIG. 2). Of course, it is to be understood that the term width refers to the dimension of the film along a line that is parallel to the long axis of at least one of the rolls.

As a rule, two of the same measuring sensors are used for registry of the location of the left and of the right edge of the plastic sheet. Numerous suitable measuring sensors are known to the skilled technician. For example, optical, thermographic, or mechanical measuring sensors can be used. Infrared measuring sensors that register the boundary profile of the edge of the hot plastic sheet with respect to the colder roll in a raster pattern are preferred; therefore, they are processing a type of thermographic pattern. These infrared measuring sensors are preferred in particular for recording the measured values from roll 2. Also, contact sensors that react directly to contact with the outside edge are suitable. These sensors are particularly suitable for recording the measured value behind roll 3.

During the extrusion, the measuring sensors register the location of the right and left edge of the plastic sheet as information about its width. The values are passed on-line to a standard electronic control and are processed there by means of an appropriate computer program. The device according to this invention is based on the proportionality of fluctuations in the width of the plastic sheet and on the height of the bulge. The proportionality conditions are specific for the particular extrusion system, the plastic being handled, the extrusion conditions and the width and height of the plastic sheet. Therefore, the particular relationships must first be determined empirically for the introduction of new methods and then used in a known manner as the basis for the computer program.

The controller responds to excessive widths caused by the bulge being too large by increasing the speed of the roll.

Conversely, the roll speed is reduced when the width is too small in order to increase the height of the bulge back to the desired value. As an alternative to the control of the roll speed, it is also possible to control the stream of the polymer melt. This can be done, e.g., by changing the speed of the extrusion screw or of the geared fluid pump.

The advantage of the present invention consists primarily in its simple design, its high sensitivity and in its universal utility. A correction of the roll speed is possible in case of changes in the thickness or height of the bulge which were practically not detectable or which were detectable only with exceptionally complicated means. Thus a very precise, indirect control of the height of the bulge is obtained. The extrusion method can be carried out in a reliable manner and with reduced rejects. The device can be used both for the extrusion of plates and also for film extrusion of transparent or nontransparent plastics of a thickness ranging from about 100 μm to 50 mm.

Other features of the invention will become apparent in the course of the following descriptions of exemplary embodiments which are given for illustration of the invention and are not intended to be limiting thereof.

EXAMPLES

The following example describes the extrusion of a film of bisphenol A polycarbonate of 2 mm thickness and 1,000 mm width.

The temperature of the plastic melt at its outlet from the extrusion nozzle (4) is about 280° C. A supercalender with three calender rolls (1, 2 and 3) of 200 mm diameter and 1,500 mm width with highly polished chrome plating are located under the lip (5) of the extrusion nozzle. The polymer melt (6) passes the glazing roll gap between the rolls 1 and 2 to form a bulge (7). The plastic sheet is wrapped by the roll 2 (2) around the roll 3 (3).

The temperature of the surface of the roll is regulated to 100° C. Beneath the roll 2 (2), there are two infrared measuring sensors (8) located at a distance of 100 mm to the roll and 1,000 mm (corresponding to the width of the film) from each other. These sensors register the boundary profile raster-like, between the plastic sheet cooled to about 160° C. and the roll 2, and thus supplies a signal that corresponds to the width of the film.

The sensors are connected to an electronic control that is controlled by means of a computer program. From the measured signals of the sensors at the left and right edge of the plastic sheet, the computer program determines the conformance or deviation from a specified desired value for the width of the plastic sheet. The computer program is designed so that a correction of the roll speed takes place in response to measured signals that indicate deviations of more than 0.1 mm in the width, so that the height of the bulge (9) is kept within tight tolerances.

This application is based on German Utility Model Application No. G 94 15 619.0 filed on Sep. 27, 1994, which is incorporated herein by reference in its entirety.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by letters patent of the United States is:

1. An apparatus for forming a thermoplastic sheet, comprising: (i) an extruder; (ii) a supercalender with a glazing roll gap positioned to receive thermoplastic melt from said extruder; (iii) means for measuring a change in a predetermined width of a thermoplastic sheet exiting from said glazing roll gap; and (iv) means for adjusting a process parameter which affects the height of a thermoplastic bulge in said glazing roll gap in response to a change in said width based upon predetermined proportionality conditions between said width and said height.

2. The apparatus of claim 1, wherein said process parameter is roll speed.

3. The apparatus of claim 1, wherein said process parameter is a rate of extrusion of a polymer melt from said extruder.

4. The apparatus of claim 1, wherein said means for measuring a change in a width of said thermoplastic is a pair of measuring sensors each measuring sensor being selected from the group consisting of optical sensors, thermographic sensors, and mechanical sensors.

5. The apparatus of claim 4, wherein said supercalendar comprises a roll 1 and roll 2, and said measuring sensors are positioned to detect the edges of said thermoplastic sheet on roll 2 (2).

6. The apparatus of claim 4, wherein said supercalendar comprises a roll 1, a roll 2 and roll 3, and said measuring sensors are positioned to detect the edges of said thermoplastic sheet downstream from roll 3 (3).

7. A method for controlling the height of a bulge in a glazing roll gap of a supercalender in the extrusion of a thermoplastic sheet, said method comprising:

(i) measuring a width of a thermoplastic sheet exiting said glazing roll gap to detect an increase or decrease in said width based upon predetermined proportionality conditions between said width and said height; and (ii) adjusting a process parameter which affects said height of said bulge based upon predetermined proportionality conditions between said width and said height so that (a) said height of said bulge is increased when a decrease in said width is detected, or (b) said height of said bulge is decreased when an increase in said width is detected.

8. The method of claim 7, wherein said process parameter is roll speed.

9. The method of claim 7, wherein said process parameter is a rate of extrusion of thermoplastic.

10. The method of claim 7, wherein said supercalendar comprises a roll 1 and roll 2, and said measuring is carried out with measuring sensors positioned to detect the edges of said thermoplastic sheet on roll 2 (2).

11. The method of claim 7, wherein said supercalender comprises a roll 1, a roll 2 and a roll 3, and said measuring is carried out with measuring sensors positioned to detect the edges of said thermoplastic sheet downstream from roll 3 (3).

* * * * *